United States Patent
Wu (10) Patent No.: US 10,117,538 B2
(45) Date of Patent: Nov. 6, 2018

(54) SOUS-VIDE COOKER WITH IMAGE TRANSLATION FUNCTIONALITY

(71) Applicant: Anova Applied Electronics, Inc., San Francisco, CA (US)

(72) Inventor: Jeff Wu, Stafford, TX (US)

(73) Assignee: Avona Applied Electronics, Inc., San Francisco, CA (US)

( * ) Notice: Subject to any disclaimer, the term of this patent is extended or adjusted under 35 U.S.C. 154(b) by 11 days.

(21) Appl. No.: 14/727,431

(22) Filed: Jun. 1, 2015

(65) Prior Publication Data
US 2015/0342390 A1    Dec. 3, 2015
US 2018/0125283 A9    May 10, 2018

Related U.S. Application Data

(63) Continuation of application No. 14/491,961, filed on Sep. 19, 2014.
(Continued)

(51) Int. Cl.
*A47J 27/62* (2006.01)
*A47J 27/10* (2006.01)
(Continued)

(52) U.S. Cl.
CPC .................. *A47J 27/10* (2013.01); *A23L 5/13* (2016.08); *A47J 27/62* (2013.01); *A47J 37/1257* (2013.01); *A47J 37/1266* (2013.01)

(58) Field of Classification Search
CPC ... A23L 3/10; A23L 5/13; A23B 4/005; A23B 4/0056; A23B 5/0057; A23B 5/005;
(Continued)

(56) References Cited

U.S. PATENT DOCUMENTS 1,703,099 A    2/1929    Craddock
1,864,149 A    6/1932    Rockwell
(Continued)

FOREIGN PATENT DOCUMENTS

CN    102192597 A    9/2011
CN    103211494 A    7/2013
(Continued)

OTHER PUBLICATIONS

Notification of Reason for Refusal dated Mar. 31, 2015; in Japanese patent application No. 2014-025539.
(Continued)

*Primary Examiner* — Drew E Becker
(74) *Attorney, Agent, or Firm* — RatnerPrestia (57) ABSTRACT

A system and apparatus for translating cooking time and temperatures from arrays of pictures of foods cooked to different degrees of doneness or other type of result. The system enables users to select a desired doneness from pictures of food and optionally add additional modifiers it based on the size, weight, shape, and fat content of the meat with additional pictures indexed to different modification parameters. The system enables users to adjust a setting if the user has modified the food he or she intends to cook, such as by cutting in half, or if the food was frozen, allowing additional cook time and parameter modifications. A program of instructions pertaining to the system can be located on a sous vide cooking device or on a device external to the a sous vide device, such as on a personal computing device.

9 Claims, 7 Drawing Sheets

Related U.S. Application Data (60) Provisional application No. 62/005,875, filed on May 30, 2014, provisional application No. 61/880,714, filed on Sep. 20, 2013.

(51) Int. Cl.
*A23L 5/10* (2016.01)
*A47J 37/12* (2006.01)

(58) Field of Classification Search
CPC .. A23B 7/005; A23B 7/0056; A47J 2027/043; A47J 27/10; A47J 27/62; A47J 37/1257; A47J 37/1266
USPC ............ 426/231–233, 523, 509–510; 99/330
See application file for complete search history.

(56) References Cited

U.S. PATENT DOCUMENTS

| | | | |
|---|---|---|---|
| 2,140,315 | A | 12/1938 | Dollinger |
| 3,114,154 | A | 12/1963 | Laughlin |
| 3,270,661 | A | 9/1966 | Alois |
| 3,273,717 | A | 9/1966 | Canterbury |
| D214,165 | S | 5/1969 | Sesholtz |
| 4,045,606 | A | 8/1977 | Kalkowski |
| 4,099,406 | A | 7/1978 | Fulkerson |
| 4,612,949 | A | 9/1986 | Henson |
| 4,817,217 | A | 4/1989 | Lively |
| 4,933,527 | A * | 6/1990 | Edamura .............. H05B 6/6411 219/506 |
| 5,146,840 | A | 9/1992 | Hedenberg |
| 5,317,134 | A | 5/1994 | Edamura |
| 5,321,229 | A | 6/1994 | Holling |
| 5,336,401 | A | 8/1994 | Tu |
| 5,368,384 | A | 11/1994 | Duncan |
| 5,372,422 | A | 12/1994 | Dubroy |
| 5,401,401 | A | 3/1995 | Hickok |
| 5,412,171 | A | 5/1995 | Yahav |
| 5,516,208 | A | 5/1996 | Givant |
| 5,542,344 | A | 8/1996 | Koether |
| 6,079,486 | A | 6/2000 | Cennamo |
| 6,113,258 | A | 9/2000 | Ardent |
| 6,286,990 | B1 | 9/2001 | De Zuazo |
| 6,539,842 | B1 * | 4/2003 | Chapman .............. A47J 37/041 374/155 |
| 6,604,917 | B2 | 8/2003 | Casper |
| 6,763,879 | B1 | 7/2004 | Macheske et al. |
| 6,796,220 | B2 | 9/2004 | Lee |
| 6,962,290 | B2 | 11/2005 | Kwon |
| 7,026,929 | B1 | 4/2006 | Wallace |
| 8,087,822 | B2 | 1/2012 | Peng |
| 8,122,815 | B2 | 2/2012 | Wolfe |
| 8,172,451 | B2 | 5/2012 | Li |
| 8,218,402 | B2 | 7/2012 | Lewis |
| 8,469,678 | B2 | 6/2013 | Preston |
| 2004/0221736 | A1 | 11/2004 | Park |
| 2004/0223404 | A1 | 11/2004 | Hughes |
| 2005/0223910 | A1 | 10/2005 | Hankinson |
| 2006/0239113 | A1 | 10/2006 | Harris et al. |
| 2008/0000357 | A1 | 1/2008 | Yang et al. |
| 2008/0066624 | A1 * | 3/2008 | Taylor .............. A47J 27/10 99/330 |
| 2008/0136581 | A1 | 6/2008 | Heilman |
| 2008/0218493 | A1 | 9/2008 | Patten et al. |
| 2008/0260557 | A1 | 10/2008 | Austin |
| 2009/0087534 | A1 | 4/2009 | McLemore |
| 2009/0093983 | A1 | 4/2009 | Trafford |
| 2009/0120301 | A1 | 5/2009 | Severnak |
| 2009/0153490 | A1 | 6/2009 | Nymark |
| 2010/0090656 | A1 | 4/2010 | Shearer |
| 2010/0154656 | A1 | 6/2010 | Yamamoto |
| 2010/0199854 | A1 * | 8/2010 | Homme .............. F24C 7/082 99/325 |
| 2011/0070340 | A1 | 3/2011 | Pechaigner |
| 2011/0088564 | A1 | 4/2011 | Bonsell |
| 2011/0117259 | A1 | 5/2011 | Storek |
| 2011/0185915 | A1 * | 8/2011 | Eades .............. A47J 27/004 99/331 |
| 2011/0186283 | A1 * | 8/2011 | Preston .............. B01L 7/02 165/287 |
| 2011/0217439 | A1 * | 9/2011 | Morandotti .............. A23L 5/17 426/510 |
| 2012/0053747 | A1 | 3/2012 | Tanaka et al. |
| 2013/0091883 | A1 | 4/2013 | Perez |
| 2013/0112683 | A1 | 5/2013 | Hegedis |
| 2013/0220143 | A1 * | 8/2013 | Fetterman .............. A47J 36/2405 99/330 |
| 2013/0302483 | A1 * | 11/2013 | Riefenstein .............. F24C 7/085 426/233 |
| 2014/0026762 | A1 * | 1/2014 | Riefenstein .......... H05B 6/6441 99/325 |
| 2014/0208957 | A1 * | 7/2014 | Imai .............. H05B 6/6435 99/342 |
| 2014/0260998 | A1 | 9/2014 | Pearson |
| 2014/0373723 | A1 | 12/2014 | Vestreli |
| 2015/0064314 | A1 * | 3/2015 | Manuel .............. A47J 36/32 426/231 |
| 2015/0257574 | A1 * | 9/2015 | Hoare .............. A47J 27/10 99/342 |
| 2015/0265090 | A1 * | 9/2015 | Pennella .............. A47J 27/10 426/232 |
| 2015/0289544 | A1 * | 10/2015 | Mendonca Vilela Pinto Ferreira .............. A23L 1/0121 426/232 |
| 2015/0335192 | A1 | 11/2015 | Plazarte |
| 2016/0083048 | A1 | 3/2016 | Munsch |
| 2016/0198883 | A1 * | 7/2016 | Wang .............. A47J 27/08 426/231 |

FOREIGN PATENT DOCUMENTS

| | | |
|---|---|---|
| EP | 2354738 | 8/2011 |
| EP | 2407703 | 1/2012 |
| GB | 2260002 | 3/1993 |
| JP | S63196984 U | 12/1988 |
| JP | 2006334208 | 12/2006 |
| JP | 2008043502 | 2/2008 |
| KR | 20120049118 | 5/2012 |
| WO | 0152478 | 7/2001 |
| WO | 2004008923 | 1/2004 |
| WO | 2012156890 | 11/2012 |
| WO | 2014019018 A1 | 2/2014 |

OTHER PUBLICATIONS

English abstract for JP2006334208; published Dec. 14, 2006.
English abstract for JP2008043502; published Feb. 28, 2008.
Extended European Search Report; European Application No. 15170176.0; dated Sep. 21, 2015.
Non Final Office Action for U.S. Appl. No. 14/491,961, dated Sep. 1, 2017, 10 pages.
Final Office Action for U.S. Appl. No. 14/885,845, dated Aug. 16, 2017, 10 pages.
Notice of Allowance for U.S. Appl. No. 14/727,444, dated Sep. 5, 2017, 5 pages.
Australian Examination Report for Australian Application No. 2014293183, dated Oct. 4, 2017, 3 pages.
Chinese Office Action for Chinese Application No. 201480051964.7, dated Sep. 25, 2017, 11 pages.
Final Office Action for U.S. Appl. No. 14/727,402, dated Apr. 20, 2017, 8 pages.
European Patent Office Extended Search Report dated May 26, 2014, for European Patent Application No. EP 14154528.5, 8 pages.
Studio Kitchen; "Anova Immersion Circulator", May 8, 2014, 8 pp, downloaded at http//www.studiokitchen.com/studio-kitchen/anova-immersion-circulator.
News Anova INc. Water Bath Company, May 7, 2014, 1 page, downloaded at http://www.waterbaths.com/news.html.
J. Kenji Lopez-Alt: "Is The Nomiku Portable Sopus-Vide Cooker the Solution We're Looking for?", Serious Eats, Jun. 28, 2012; 2

(56) References Cited

OTHER PUBLICATIONS pages, downloaded at http://www/seriouseats.com/2012/06/is-the-nomiku-portable-sous-vide-cooker-the-s.html.
International Search Report and Written Opinion of the International Searching Authority for International Application No. PCT/US2014/047838, dated Jan. 21, 2015.
Non Final Office Action for U.S. Appl. No. 14/727,402, dated Dec. 14, 2017, 12 pages.
European Communication for European Application No. 15192763.9, dated Mar. 23, 2018, 4 pages.
Non Final Office Action for U.S. Appl. No. 14/491,961, dated Apr. 10, 2018, 8 pages.
Notice of Allowance for U.S. Appl. No. 14/491,961, dated Jan. 22, 2018, 10 pages.
Extended European Search Report for European Application No. 15170168.7, dated Sep. 23, 2015, 4 pages.
Extended European Search Report for European Application No. 15170175.2, dated Sep. 21, 2015.
Australian Examination Report for Australian Application No. 2014200334, dated Mar. 20, 2018, 4 pages.
Notice of Allowance for U.S. Appl. No. 14/727,431, dated Feb. 14, 2018, 9 pages.
Notice of Allowance for U.S. Appl. No. 14/727,431, dated Sep. 29, 2017, 8 pages.
Extended European Search Report dated Sep. 24, 2015, European Application No. 15170165.3, 5 pages.
Chinese Office Action for Chinese Application No. 201510293958.9, dated Apr. 25, 2018, including English translation, 10 pages.
Final Office Action for U.S. Appl. No. 14/727,402, dated Apr. 20, 2018, 15 pages.
European Communication Pursuant to Article 94(3) EPC for European Application No. 15170175.2, dated Jun. 8, 2018, 6 pages.
Notice of Allowance for U.S. Appl. No. 14/727,444, dated May 22, 2018, 7 pages.
Notice of Allowance for U.S. Appl. No. 14/727,402, dated Jul. 2, 2018, 6 pages.
Final Office Action for U.S. Appl. No. 14/491,961, dated Jul. 16, 2016, 8 pages.
Chinese Office Action for Chinese Application No. 20150293958.9, dated Aug. 10, 2018 with translation, 8 pages.
Non Final Office Action for U.S. Appl. No. 14/885,845, dated Aug. 27, 2018, 33 pages.
Non Final Office Action for U.S. Appl. No. 14/907,533, dated Aug. 9, 2018, 24 pages.
Non Final Office Action for U.S. Appl. No. 15/890,439, dated Aug. 9, 2018, 12 pages.

\* cited by examiner

SOUS-VIDE COOKER WITH IMAGE TRANSLATION FUNCTIONALITY

CROSS-REFERENCE TO RELATED APPLICATIONS

This application is a continuation-in part of U.S. application Ser. No. 14/491,961, filed on Sep. 19, 2014, which claims the benefit of U.S. Provisional Application No. 61/880,714, filed Sep. 20, 2013. This application also claims priority to U.S. provisional application No. 62/005,875, filed on May 30, 2014, the entire contents of all of the above-listed applications are incorporated by reference herein.

FIELD OF TECHNOLOGY

The present disclosure relates generally to food cooking devices, and more specifically, to precision temperature control water bath heaters and water pumping heating circulator appliance for cooking food in water.

BACKGROUND

Sous-vide is a method of cooking food sealed in airtight plastic bags in a water bath for longer than normal cooking times at an accurately regulated temperature much lower than normally used for cooking, typically around 55° C. (131° F.) to 60° C. (140° F.) for meats and higher for vegetables. Current sous-vide equipment are built with singular sous vide functionality such as a thermal circulator or a temperature controlled water bath and cannot be used for conventional cooking.

However sous vide cooking results vary by the temperature, time and fat/protein contents of foods. It is highly difficult for user to know what the proper temperature to cook dishes. Additionally foods purchased from the grocery store have a wide variety of quality and fat content on top of the fact that there are a numerous temperature recipes for sous vide that are unverified online leading incorrect cook times and temperatures resulting in less than optimal results.

BRIEF DESCRIPTION OF THE DRAWINGS

In order to describe a manner in which features of the disclosure can be obtained, reference is made to specific embodiments that are illustrated in the appended drawings. Based on an understanding that these drawings depict only example embodiments of the disclosure and are not intended to be limiting of scope, the principles herein are described and explained with additional specificity and detail through the use of the accompanying drawings in which.

DETAILED DESCRIPTION

Broadly speaking, this disclosure relates to sous-vide circulator cookers for home sous-vide cooking. The disclosed devices are particularly suited for use in home kitchens, however, the devices are not limited to home kitchens and can be used in commercial environments.

Various embodiments of the disclosure are discussed in detail below. While specific implementations are discussed, it should be understood that this is done for illustration purposes only. A person skilled in the relevant art will recognize that other components and configurations may be used without departing from the scope of the disclosure. Several definitions that apply throughout this document will now be presented. "Circulating" means agitating, blending or mixing of one or more fluids. Hence a "circulator" is a device which can be configured to agitate, blend or mix a fluid. Fluids will be understood to comprise liquids. "Coupled" is defined as connected, whether directly or indirectly through intervening components and is not necessarily limited to physical connections. Coupled devices are devices which are in signal communication with one another. "Connected" means directly connected or indirectly connected. "Sealed" can mean hermetically sealed, mechanically sealed or to make imperious to air and fluid.

The terms sous-vide, circulator cooker, circulator cooker, fluidic temperature control device, and cooker are used interchangeably throughout this specification and each refers to a device configured to cook food in temperature controlled water bath.

In at least one embodiment, a sous-vide circulator cooker can have one or more turn-able or rotatable information displays. The display can be located on the top the cooker and can be configured to keep electronics housed therein away from steam, water and heat and to enable easy viewing from a plurality of different angles.

In at least one embodiment, a sous-vide circulator cooker can include a detachable skirt which enables cleaning of the skirt and cleaning of a heater and water pump covered by the skirt. In at least one embodiment, the removable skirt can also expose the water pump impellers enabling a user to clean out food and debris. In at least one embodiment the skirt can be removed without tools. In at least one embodiment the skirt can be stainless steel, aluminum and/or plastic.

In at least one embodiment a sous-vide circulator cooker can have a water proof submersible pump in which the motor can be located under water, at the water line, or above water, with inflow and outflow lines. In at least one embodiment, the submersible pump can also be opened and/or accessed without tools for cleaning. In at least one embodiment, the cooker can be configured such that one or more motors of the cooker can be easily removed for cleaning or replacement.

In another embodiment, the entire circulator system can be sealed and can be submersed into water whether purposely or by accident, without damaging any components of the circulator system.

In at least one embodiment, a fluidic temperature control device can include a housing that defines the shape or form of the device. The housing can internally enclose and support various electrical components (for example, motors, fans, and/or electronics). In at least one embodiment, the housing can be cylindrical. In another embodiment, the housing can be a shape other than cylindrical, for example, rectangular, circular, square, oval.

In at least one embodiment, a fluidic temperature control device for sous-vide cooking can include an upper portion including a controller, a display device and an input device coupled to the controller; a middle portion connected to the upper portion, the middle portion housing a motor coupled to the controller; a lower portion connected to the middle portion, the lower portion housing a fluid agitation device coupled to the motor, a heating element coupled to the controller, and the lower portion configured for at least partial immersion in a fluid.

In at least one embodiment, a fluidic temperature control device can include a clamp that enables an operator to secure the fluidic temperature control device to a container. In at least one embodiment, the clamp or other securement device can be configured to enable the height of the cooker to be adjusted with respect to the water bath or the chamber containing the bath, (for example, a cooking pot). In at least one embodiment, the sous-vide cooker can have a ring clamp that enables an operator to turn the entire system to vector the pump output or to turn the system for better display viewing angle.

In at least one embodiment, components of a fluidic temperature control device can be controlled by a remote device, for example, a phone, a server, a tablet, a Personal Computer (PC) or other electronic device. The remote device can be wirelessly and communicatively coupled to the cooker, for example, by Wi-fi, Bluetooth, Near Field Communication (NFC), short-range wireless or other similar system capable of sending and receiving data. In at least one embodiment, the fluidic temperature control device or the remote device controlling the fluidic temperature control device can be configured to wirelessly transmit information about cooking operations, such as a warning that additional water is required in the chamber cooking the food, or an alert indicating that cooking has been completed. In at least one embodiment, a fluidic temperature control device can receive recipe specifications from the remote device. The specifications can then direct the cook time, water pump speed, and cook temperature of the device.

In at least one embodiment, the fluidic temperature control device can include a memory storage unit. The memory storage unit can be used to store information such as favorite recipes and cooking parameters for certain foods. In at least one embodiment, a fluidic temperature control device can store a plurality of recipe specifications and user generated data files. Users of the device can recall recipe specifications from an internal recipe book. In at least one embodiment, the sous-vide circulator cooker can categorize stored recipe specifications and generated data files which can be searchable.

In at least one embodiment, a fluidic temperature control device can be configured to communicate with a wireless thermometer which can be placed in a bag or other suitable container containing food being cooked by the cooker, proximate the food. A thermometer located proximate the food can enable the cooker to have extremely accurate information about the temperature of the food being cooked. Accurate information regarding food temperature can enhance the quality of the cooked food and can aid in ensuring the food is properly and thoroughly cooked (thereby ensuring food safety). In at least one embodiment, the wireless thermometer can be inductively rechargeable.

In at least one embodiment, fluidic temperature control device can be constructed to protect electronic components of the device from environmental factors associated with cooking, for example, high temperatures, water, and steam. In at least one embodiment, one or more portions of the fluidic temperature control device can dynamically change color depending on operational state of the device. In at least one embodiment, the portions of the sealed housing are configured to change color and to provide information regarding an operational state of the device.

In at least one embodiment, the upper portion of the fluidic temperature control device can be configured to protect the controller, display device and input device from steam during use. In at least one embodiment, the agitation device can be an impeller or a rotatable blade.

In at least one embodiment, the lower portion of the fluidic temperature control device or housing can be composed of at least stainless steel, aluminum or plastic, and is removable without tools. In at least one embodiment, the lower portion can contain slits or openings running along at least a portion of a length of the lower portion. In at least one embodiment, the lower portion can be removable from the middle portion and removal of the middle portion exposes the agitation device. In at least one embodiment, the upper portion of the fluidic temperature control device can be rotatable with respect to the middle portion.

In at least one embodiment, the heating element can be proximate the agitation device. Additionally, the heating element can be housed substantially within the agitation device. In at least one embodiment, the controller can be configurable to control the temperature of the heating element. In at least one embodiment, the controller can be configurable to receive data inputted via the input device, the data comprising control commands to control the temperature of the heating element. At least one embodiment of a fluidic temperature control device for sous-vide cooking can include an upper portion including a turn-able display and an input device coupled to the microprocessor controller; a middle portion connected to the upper portion, the middle portion housing a temperature controller controlled by the microprocessor; and a lower portion connected to the middle portion. The lower portion can house or encase a submersible fluid agitation device including impellers and motor, and a heating element coupled to the temperature controller, the lower portion configured for at least partial immersion in a fluid.

In at least one embodiment, the upper portion and middle portion can be sealed, thereby preventing water entry, thereby protecting electronics, the display and other electrical devices within the fluidic temperature control device. In at least one embodiment, the agitation device can be wholly or partially submersible. The agitation device can include a pump system having a motor and an impeller. The agitation device can also comprise a rotatable impeller blade.

In at least one embodiment, the lower portion can be configured to be removable from the middle portion such that removal of the lower portion exposes the agitation device and heaters. In at least one embodiment, the middle portion can have two adjustable electrodes that can sense the water level. In at least one embodiment, the lengths of the electrodes can be adjustable to enable detection of different water levels. In at least one embodiment, the electrodes can be configurable with attachments that enable adjustment of a length of the electrodes.

In at least one embodiment, the controller can be configurable to receive data inputted via the input device, the data comprising control commands to control the temperature of the heating element. In at least one embodiment, the temperature controller is configurable to control the temperature of the heating element. In at least one embodiment, the heating element is located proximate the agitation device.

At least one embodiment of a fluidic temperature control device can comprise a controller located in a sealed housing; a submersible pump connected to the sealed controller; adjustable electrodes to detect water level; and a ring clamp enabling the device to be turned.

In at least one embodiment, the entire device can be submersed in water without negatively impacting the operation of the system. In at least one embodiment, the submersible pump can be opened without tools to expose the impeller blades. In at least one embodiment, the submersible pump can include a barb located on the pump outlet containing a tube receiver.

At least one embodiment within this disclosure is a method which includes receiving, at a fluidic temperature control device, a pre-cooked food, wherein the pre-cooked food is from a plurality of pictures of pre-cooked foods with corresponding cook times and temperatures; receiving, at the fluidic temperature control device, one or more food attributes, wherein the one or more food attributes is from a plurality of pictures of food attributes with corresponding supplemental cook times and supplemental temperatures; and modifying, at the fluidic temperature control device, the selected pre-cooked food cook time and temperature with the supplemental cook time and supplemental temperature.

In at least one embodiment, a method can also include receiving, at the fluidic temperature control device, a doneness level, wherein the doneness level is from a plurality of pictures of doneness levels with a corresponding second supplemental cook time and a second supplemental temperature; modifying, at the fluidic temperature control device, the modified cook time and modified temperatures with the second supplemental cook time and the second supplemental temperature. The method further comprising configuring the fluidic temperature control device to the second modified cook time and the second modified temperature. The method of claim 3, further comprising rendering, at a display of the fluidic temperature control, a notification of an unsafe time and temperature when the second modified cook time and the second modified temperatures are outsides a threshold safety value.

In at least one embodiment, a method can also include configuring the fluidic temperature control device to the modified cook time and modified temperature. The method further comprising rendering, at a display of the fluidic temperature control device, a notification of an unsafe time and temperature when the modified cook time and the modified temperatures are outsides a threshold safety value. The method further comprising receiving, at the fluidic temperature control device, a manual input of a temperature.

At least one embodiment within this disclosure is a system comprising a fluidic temperature control device including a processor, a non-transitory computer readable memory, a display, a heating element, and an agitator; the memory coupled with the processor, wherein the memory is configured to provide the processor with instructions which when executed cause the processor to render on the display one or more selectable pre-cooked food items; determine a cook time, a temperature, and a speed in response to a selection of the pre-cooked food item; render on the display one or more selectable food attributes; update the cook time, the temperature, and the speed in response to a selection of the food attribute.

In at least one embodiment of a system, the memory can store instructions to cause the processor to render on the display one or more doneness levels; calculate the updated cook time, the temperature, and the speed in response to a selection of the doneness level. The memory can also include instructions to set the calculated cook time, actuate the heating element to the calculated temperature, and actuate the agitator to the calculated speed. The non-transitory computer readable memory can also include instructions to render on the display a notification of an unsafe cook time and temperature when the calculated cook time and the calculated temperatures are outside a threshold safety value.

In at least one embodiment of a system, a memory can store instructions to set the updated cook time, actuate the heating element to the updated temperature, and actuate the agitator to the updated speed. A memory can also include instructions to render at the display, a notification of an unsafe time and temperature, when the updated cook time and the updated temperatures are outsides a threshold safety value. The memory can also include instructions to control the display to receive a manual input of a temperature.

At least one embodiment within this disclosure is a non-transitory computer readable medium storing instructions to cause a processor to render on a display one or more selectable pre-cooked food items; cause a processor to determine a cook time, a temperature, and a speed in response to a selection of the pre-cooked food item; cause a processor to render on the display one or more selectable food attributes; cause a processor to update the cook time, the temperature, and the speed in response to a selection of the food attribute.

In at least one embodiment, a non-transitory computer readable medium can also include instructions to cause a processor to render on the display one or more doneness levels; cause a processor to calculate the updated cook time, the temperature, and the speed in response to a selection of the doneness level. A non-transitory computer readable medium can also include instructions to cause a processor to set the calculated cook time, actuate the heating element to the calculated temperature, and actuate the agitator to the calculated speed.

In at least one embodiment, a non-transitory computer readable medium can store instructions to cause a processor to render on the display a notification of an unsafe cook time and temperature when the calculated cook time and the calculated temperatures are outside a threshold safety value. A non-transitory computer readable medium can also store instructions to cause a processor to set the updated cook time, actuate the heating element to the updated temperature, and actuate the agitator to the updated speed. A non-transitory computer readable medium can also store instructions to cause a processor to render at the display a notification of an unsafe time and temperature when the updated cook time and the updated temperatures are outsides a threshold safety value.

Figure 1:
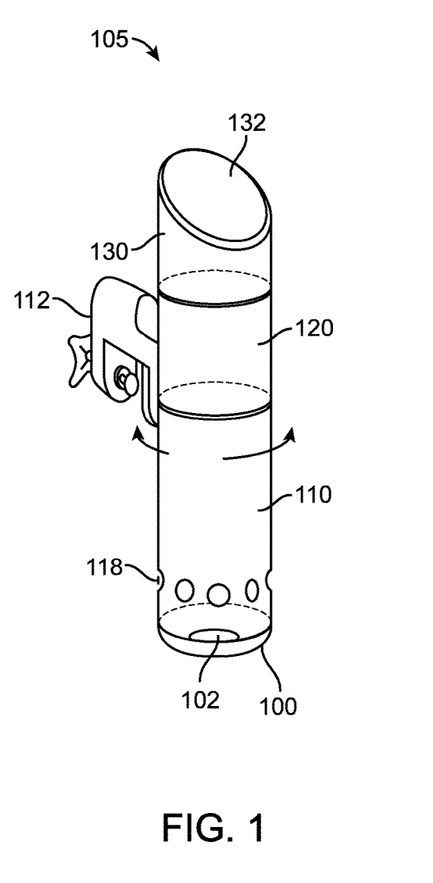
FIG. 1 illustrates a fluidic temperature control device in accordance with an example embodiment.
Figure 2:
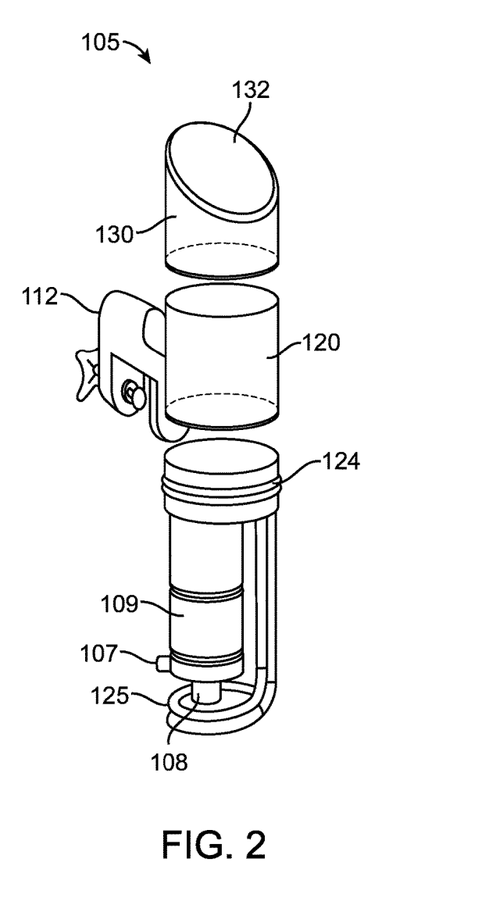
FIG. 2 illustrates a fluidic temperature control device in accordance with an example embodiment.

FIGS. 1 and 2 illustrate an example embodiment of a fluidic temperature control device 105. The temperature control device 105 comprises an upper portion 130, a middle portion 120 and a lower portion 110. In at least one embodiment, a fluidic temperature control device can include two portions: an upper and a lower. In at least embodiment, a fluidic temperature control device can include one portion. In at least one embodiment, a fluidic temperature control device can include one or more portions. The upper portion 130 can include a display device 132 which can display information, for example, the temperature of the fluid in which the lower portion 110 is at least partially immersed, the throughput at which intake and ejection ports are operating, or the speed at which an impeller housed within the lower portion is spinning. The upper portion 130 can also include an input device (not shown), for example, one or more buttons or controls which can enable a user to select a temperature for the water in which the lower portion is at least partially immersed. In at least one embodiment, the input device can include physical buttons and/or virtual buttons rendered on display device 132. The buttons or input controls can include capacitive sensor pads. The middle portion 120 can comprise a ring clamp 112 enabling attachment of control device 105 to a container, or the like. Middle portion 120 can include housing 124 for motor and heater base (not shown). Lower portion 110 can be configured with a cap 100 configured with one or more openings 102. Lower portion 110 can enclose submersible pump 109 with one or more liquid intake ports 107 and ejection ports 108. Alternatively, ports 108 can be fluid ejection ports and ports 107 can be fluid intake ports. The lower portion 110 can be configured with liquid intake (flow-in) openings 118 through which the heated water can be drawn by submersible pump 109, an impeller or other agitation device located within the lower portion 110 and ejected out of lower portion 110 through liquid ejection (flow-out) openings 102. Alternatively, openings 118 can be liquid output (flow-out) openings and openings 102 can be liquid intake (flow-in) openings. The lower portion 110 can included a thermometer device for taking the temperature of the fluid in which it is immersed. In another embodiment the thermometer can be separate device 105 and in wireless communication with device 105.

Figure 3:
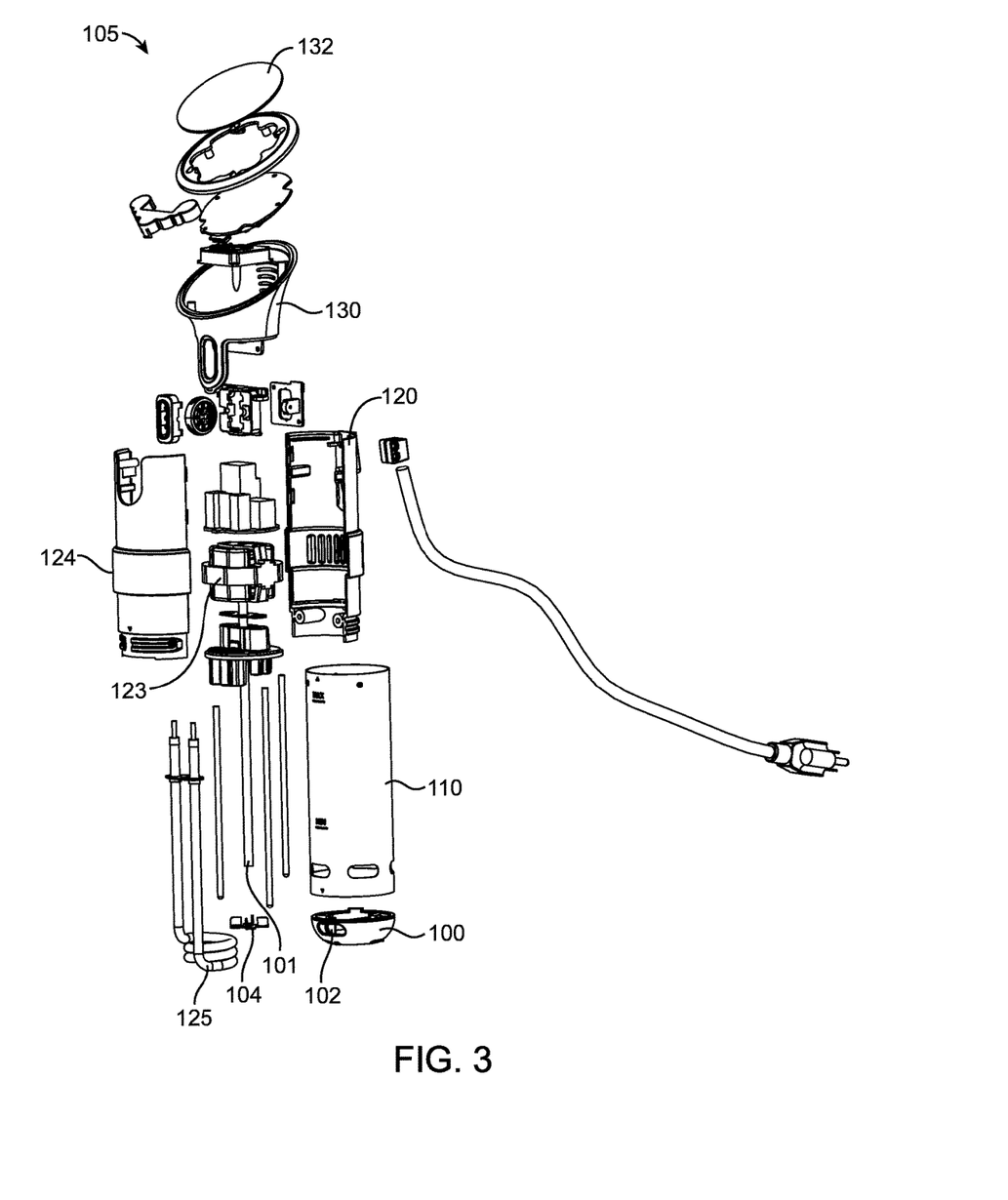
FIG. 3 illustrates a fluidic temperature control device in accordance with an example embodiment.

FIG. 3 illustrates components of at least one embodiment of a fluidic temperature control device 105. The device can include a lower portion 110. The lower portion 110 can be a removable, tool-less screw or clamp-on circulator pump other agitation device housing. Lower portion 110 can include heaters 125, drive shaft 101 and impeller 104. The lower portion 110 can be composed of stainless steel or other suitable materials. In one embodiment, the lower portion 110 can be a removable clamp-on on skirt. The lower portion 110 can be configured with one or more liquid intake (flow-in) openings 118. Alternatively, openings 118 can be liquid output (flow-out) openings. The device 105 can also include a liquid ejection (flow-out) cap 100 with one or more openings 102 on the side or bottom at the through which fluid can pass (as liquid intake (flow-in) or liquid output (flow-out)). Middle portion 120 can enclose motor and heater base 123 connected to electric heaters 125. Middle portion 120 can also comprise a fan (not shown) to blow out any steam that may be present. Middle portion 120 can include collar 124 including one or more openings to provide ventilation to motor and heater base 123. Device 105 can include an upper portion 130. The upper portion 130 can include a LCD display 132 with touch controls. Device 105 can be sealed against water/air and can be fully submersed for periods of time in the cooking vessel containing the fluid being heated by the device.

Figure 4:
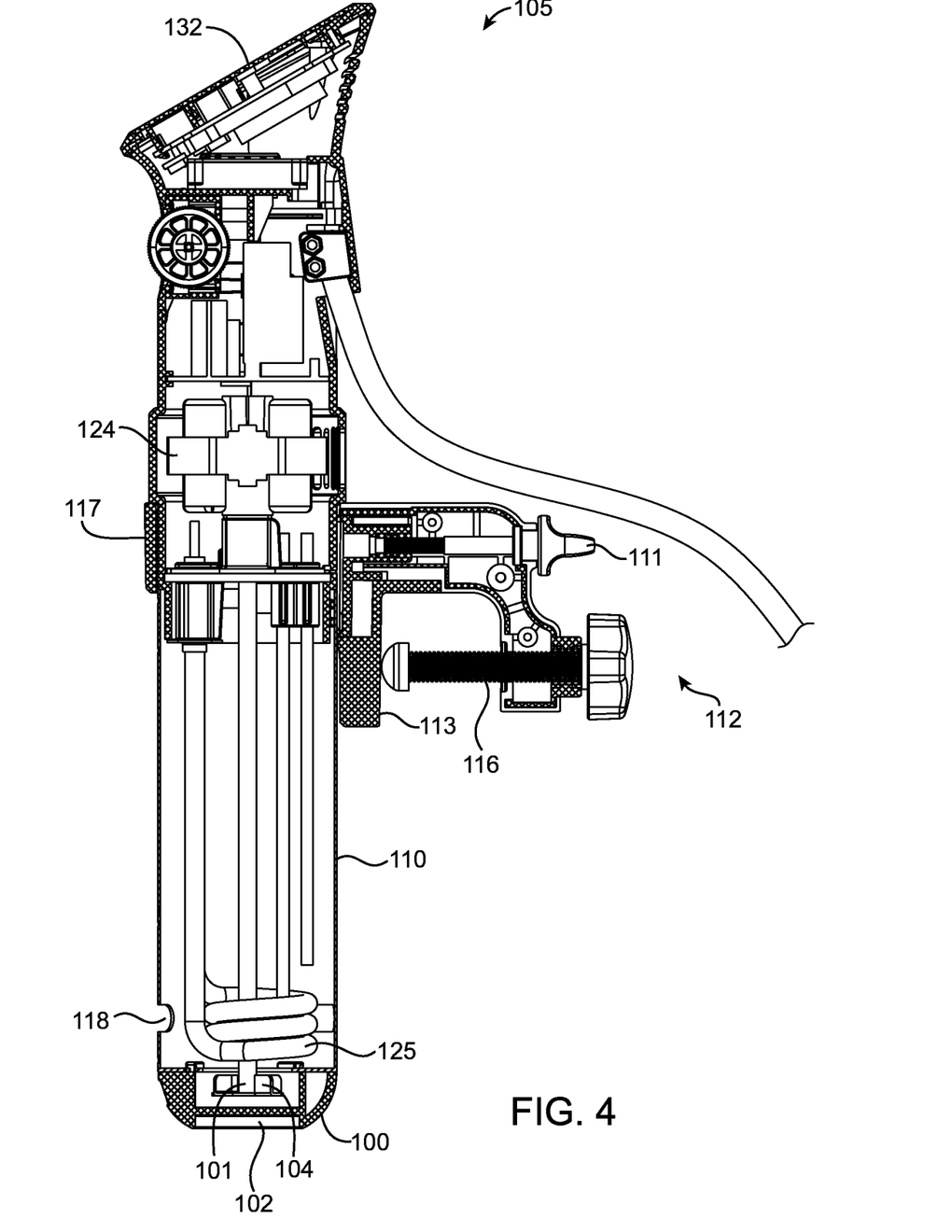
FIG. 4 is a cross-sectional view of a fluidic temperature control device in accordance with an example embodiment.

FIG. 4 is a cross-sectional view illustrating an example embodiment of fluidic temperature control device 105 having a clamp 112. The clamp 112 can be configured to releasably secure the fluidic temperature control device 105 to a pot, or any container holding a fluid. The clamp 112 can have a collar 117 and an attachment portion 111 at the uppermost portion of the clamp. The collar 117 can circumferentially engage with device 105 by attachment portion 111. The attachment portion 111 can be spring operated and configured to enable the clamp 112 to attach to the fluidic temperature control device 105. The clamp 112 can further have a stationary engagement portion 113 configured to engage an inner portion of a pot. The clamp 112 can further have a moveable engagement portion 116 configured to engage an outer portion of the pot thereby securing the fluidic temperature control device 105 to the pot. The collar 117 can be positioned at any point along the fluidic temperature control device 105 to enable adjustment in the length of the lower portion 110 that is immersed in fluid of container 114.

Figure 5:
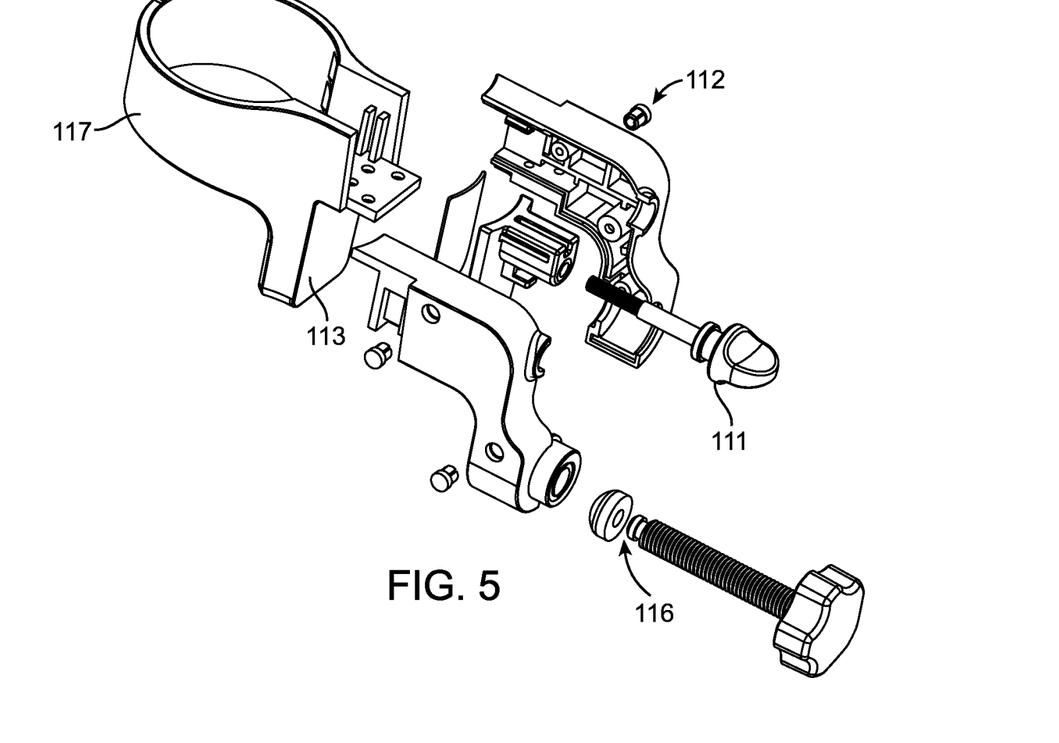
FIGS. 5-6 illustrates a clamping mechanism for a fluidic temperature control device in accordance with an example embodiment.
Figure 6:
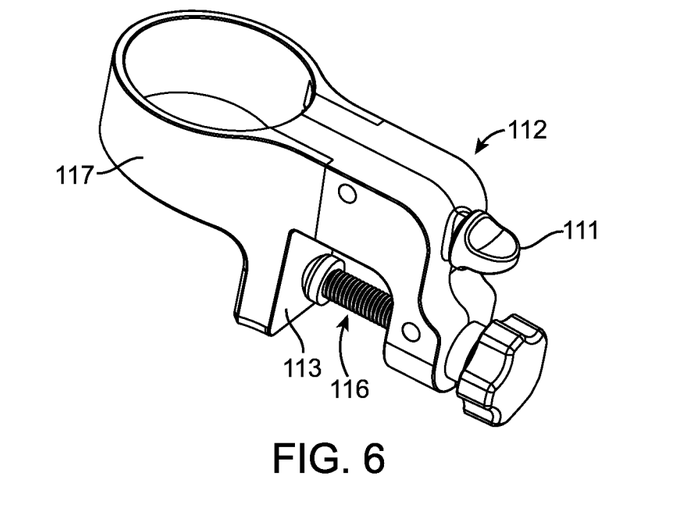

FIG. 5 and FIG. 6 illustrate an exploded view and assembled view of an example clamp 112 respectively. Clamp 112 can include a collar 117 to engage with a temperature control device (not shown). Collar 117 can be engaged by actuating attachment portion 111. Attachment portion 111 can be spring-loaded. When attachment portion 111 is actuated, collar 117 can be engaged with the temperature control device preventing movement of collar 117. Clamp 112 can also include a stationary engagement portion 113. Stationary engagement portion 113 can be configured to engage the inside wall of a container. Clamp 112 can also include a moveable engagement portion 116. Moveable engagement portion 116 can be configured to engage the outside wall of a container. Moveable engagement portion 116 can be actuated by a screw mechanism. In another embodiment, moveable engagement portion 116 can be spring-loaded.

Figure 7:
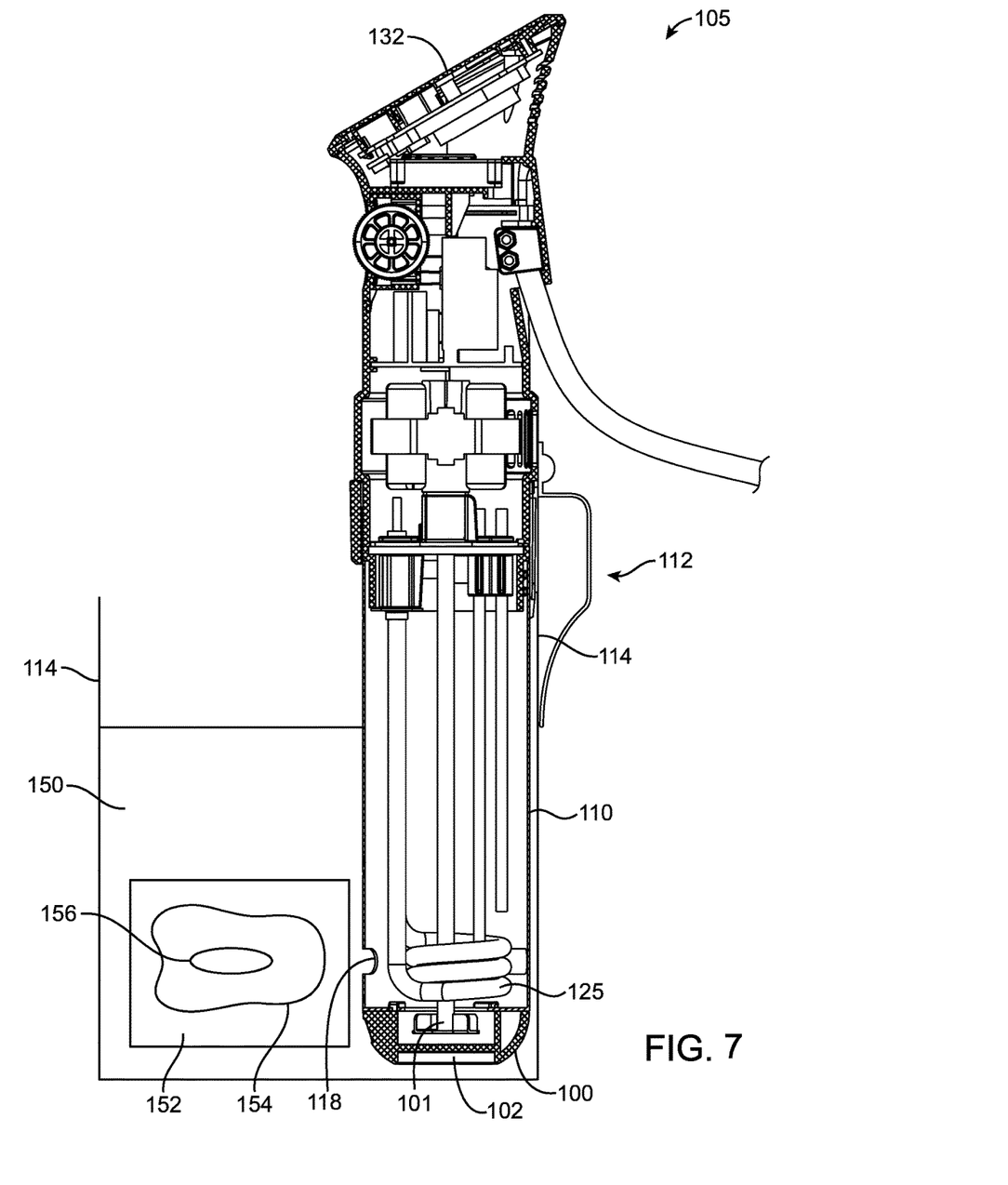
FIG. 7 is a cross-sectional view of a fluidic temperature control device in accordance with an example embodiment.

FIG. 7 illustrates an example fluidic temperature control device in communication with a wireless temperature sensor. Device 105 is adjustably attached to container 114 containing fluid 150 (for example water). The temperature of fluid 150 can be regulated by device 105, as previously described. The wireless temperature sensor 156 can be placed proximate (or within) the food 154 within a sealed container 152 (for example, a plastic bag or plastic envelope) located in fluid 150. In another embodiment, the temperature sensor can be wired to and located at fluidic temperature control device 105.

Figure 8:
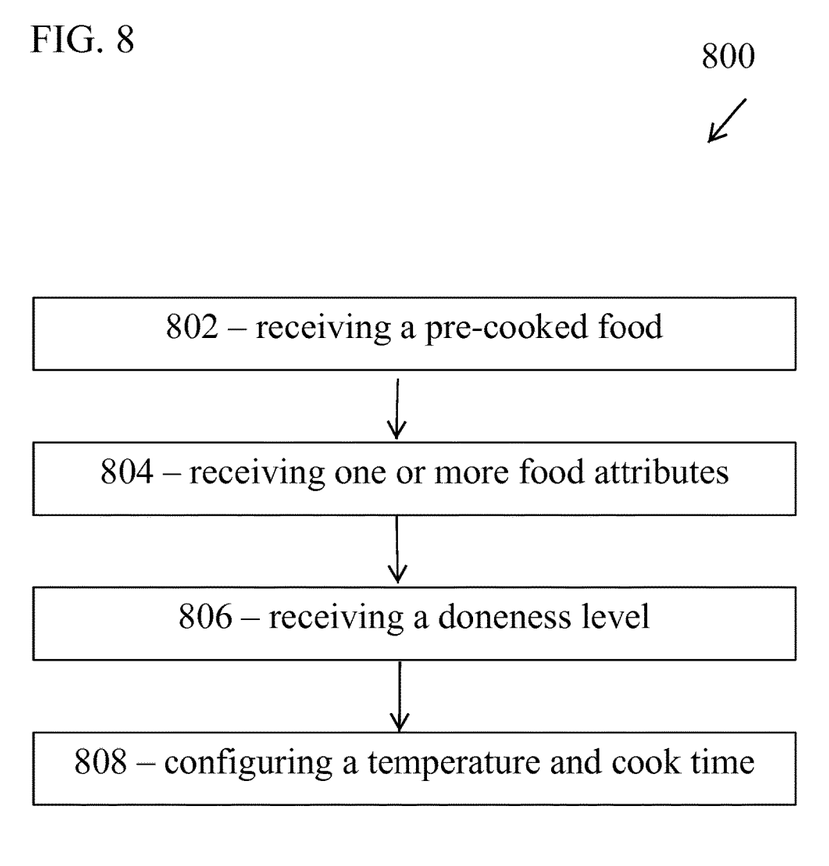
FIG. 8 is a flowchart of an example method for selecting a cook time and temperature, in accordance with an example embodiment.

FIG. 8 is a flowchart of an example method for selecting cooking settings. A method 800 is provided by way of example, as there are a variety of ways to carry out the method. The method 800 described below can be carried out using the configurations illustrated in at least FIGS. 1 and 7, for example, and various elements of these figures are referenced in explaining example method 800. The method of FIG. 8 is provided by way of example, as there are a variety of ways to carry out the method. Additionally, while the example method 800 is illustrated with a particular order of steps, those of ordinary skill in the art will appreciate that FIG. 8 and the steps illustrated therein can be executed in any order that accomplishes the technical advantages of the present disclosure and can include fewer or more steps than illustrated.

Each block shown in FIG. 8 can represent one or more processes, methods or subroutines, carried out in example method 800. The steps illustrated in FIG. 8 can be implemented in the device 105 illustrated in at least FIGS. 1 and 7. Additionally, those of ordinary skill in the art will appreciate that the steps illustrated in FIG. 8 can include instructions of processes stored in a non-transitory computer readable medium communicatively coupled to at least device 105. For purposes of illustration, FIG. 8 will be described from the perspective of the device 105.

Method 800 can begin at block 802. At block 802, a fluidic temperature control device, for example, a portable sous-vide cooker, can receive a pre-cooked food. In at least one embodiment, a selection of pre-cooked food is received by a selection on a display of the device 105. In at least one embodiment, the selection can be made from a remote device, for example, a mobile phone, personal computer, tablet, or other device configured to connect wirelessly with device 105. The pre-cooked food can have corresponding cook times and temperatures. The fluidic temperature control device 105 can store a plurality of pictures of precooked meats with corresponding cook times and temperatures. The corresponding cook times and temperatures can be based on the type of food in the picture. In at least one embodiment, the selection can be made from a remote device, for example, a mobile phone, personal computer, tablet, or other device configured to connect wirelessly with device 105. For example, the food can be chicken, and the corresponding cook time can be 3 hours and the corresponding temperature can be 150 F. In another example, the food type can also be ribeye and the corresponding cook time can be 1 hour and the corresponding temperature can be 130 F. In another example, the food type can also be vegetables and the corresponding cook time can be 30 minutes and the corresponding temperature can be 180 F. When a selection of a pre-cooked food to received at block 802, the method can proceed to block 804.

At block 804, the fluidic temperature control device can receive one or more food attributes. In at least one embodiment, the food attributes is received by a selection on a display of the device 105. In at least one embodiment, the selection can be made from a remote device, for example, a mobile phone, personal computer, tablet, or other device configured to connect wirelessly with device 105. The food attributes can be can have supplemental cook times and temperatures. The food attributes can be a thickness, a fat content, a size, a weight, or a shape of food. The fluidic temperature control device 105 can store a plurality of pictures of the food attributes and corresponding supplemental cook time and temperatures. In at least one embodiment one or more food attributes can be selected. In at least one embodiment no food attribute is selected. The corresponding supplement cook times and temperatures for the selected food attributes can be combined with the selection of the pre-cooked food in block 802 to determine the total cook time and total temperature for cooking. For example, with a pre-cooked food of ribeye, the food attributes can be a thickness of 2 inches and a weight of 2 lbs., and the corresponding supplemental temperature and cook time can be 0 degrees and 2 hours, respectively. The total temperature and cook time can be 130 F and 3 hours, respectively. When a food attribute is received at block 804, the method can move to block 806.

At block 806, the fluidic temperature control device can receive a doneness level. The doneness level can have supplemental cook times and temperatures. In at least one embodiment, the doneness lever is received by a selection on a display of the device 105. In at least one embodiment, the selection can be made from a remote device, for example, a mobile phone, personal computer, tablet, or other device configured to connect wirelessly with device 105. The doneness levels can be well done, medium well, medium, medium rare, rare, blue, al dente, tender, soft, or firm. The fluidic temperature control device 105 can store a plurality of pictures of the doneness levels and corresponding supplemental cook time and temperatures. The corresponding supplement cook times and temperatures for the selected doneness level can be combined with the selection of the pre-cooked food in block 802 and/or the selection of the food attribute in block 804 to determine the total cook time and total temperature for cooking. For example, with a pre-cooked food of ribeye, and a food attributes of thickness of 2 inches and a weight of 2 lbs., and a doneness level of medium the supplemental temperature and cook times can be 0 degrees and −1 hour, respectively. The total temperature and cook time would be 130 F and 2 hours, respectively. In another example, if the doneness level is well done the supplemental temperature and cook times can be 50 degrees and 0 hours, respectively. The total temperature and cook time can be 180 F and 3 hours, respectively. When a doneness level is received at block 806, the method can move to block 808.

At block 808, the fluidic temperature control device can be configured to a temperature and cook time. In at least one embodiment, fluidic temperature control device 105 can actuate the heating element to a specific degree Fahrenheit (or Celsius) and set a cook time in hours, minutes, and seconds. In at least one embodiment and agitator of device 105 can be configured to a corresponding speed to circulate the fluid to the specific temperature. In at least one embodiment the speed of the agitator is determined by the selections of at least one of a pre-cooked food, food attributes, or doneness level. For example, with a pre-cooked food of ribeye, and a food attributes of thickness of 2 inches and a weight of 2 lbs, and a doneness level of medium the heating element can be actuated to 130 F and the cook time can be set to 2 hours. When the fluidic temperature control device has been configured at block 808, the method 800 can end.

In at least one embodiment, the plurality of pictures and another plurality of pictures can be displayed individually, or in relation to text descriptions.

In at least one embodiment, device 105 can display a notification on a display of the device of an unsafe time and temperature if cook time and temperatures are outside of a threshold of recommended safety zones.

In at least one embodiment, the sous-vide cooker can allow a user to input a temperature of an item to be cooked to allow further adjustment.

Figure 9:
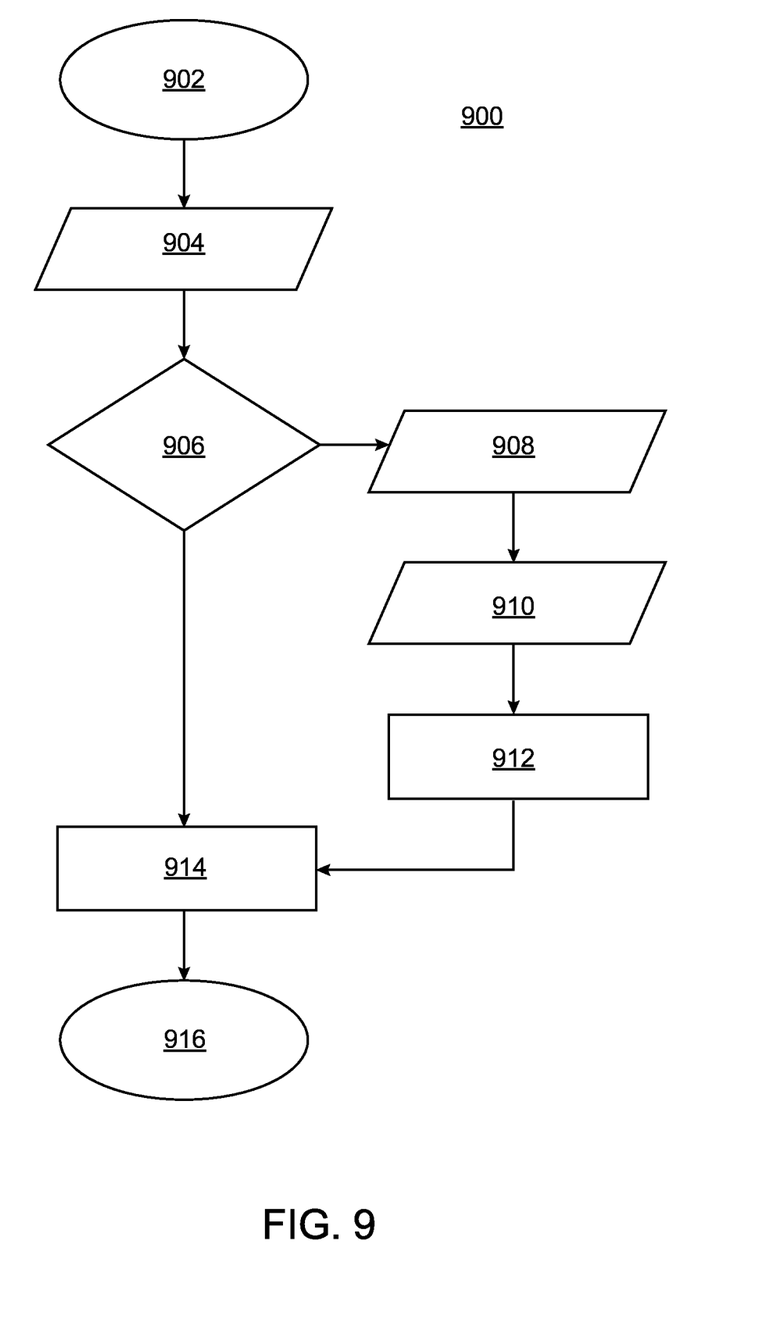
FIG. 9 is a flowchart of another example method for selecting a cook time and temperature, in accordance with an example embodiment.

FIG. 9 illustrates another example method 900. The method 900 begins at step 902. The method proceeds to step 904. At step 904, a program executed by a processor associated with a cooker causes a display to display an array of cooked food images that correspond to cook specifications. Images arrays correspond to different variations of food cooked with different times and temperatures. For example, "steak" can have different results, such as cooking temperatures differing by four degrees Fahrenheit, which can require a large array of options for the user to choose from. Once the cooking attributes are received, the method can proceed to step 906. At step 906, a user can select an image depicting a desired cook result (for example, "medium"/"well done) to start a cook specification or add in additional food attributes to further modify cook specifications. If the user does so, the method proceeds to step 908. If the user instead simply elects to begin cooking, the method proceeds to step 914, which is discussed below. At step 908, additional food attributes are input. One of the primary additional modifiers is weight of the food. If a user elects to add additional food attributes the method can accommodate additional modifiers to change cook attributes. Once additional attributes are input, the method proceeds to step 910. At step 910 additional food attributes/ modifiers are received. Additional modifiers can further tune the cook specifications. The method can thus take into account supplemental information regarding the food, including, but not limited to, size, and state (frozen, cold, warm) and can also include non-food information like circulator power, and environment stability that all impact cook specifications. Once step 910 is complete, the method proceeds to step 912, wherein a user can make further manual adjustments according to the user's individual preferences, such as the user's flavor preferences. For instance cooking at 140 degrees Fahrenheit for one hour can result in a medium steak with a raw meat taste profile but cooking at 140 Fahrenheit for six hours can result in a medium steak with a stewed taste profile. Once step 912 (or step 906) is complete, the method proceeds to step 914. At step 914, safety checks are performed, run specifications modified (such as time, temperature and other such parameters) based on cook attributes. Appropriate cook specifications are thus calculated and executed by a cooker. The method then proceeds to step 914 where it ends.

Various embodiments within this disclosure can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various embodiments also can be implemented as part of at least one service or Web service, such as can be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Various embodiments can utilize at least one network that would be familiar to those skilled in the art for supporting communications using any of a variety of commercially-available protocols, such as TCP/IP, OSI, FTP, UPnP, NFS, CIFS, and AppleTalk™. The network can be, for example, a local area network, a wide-area network, a virtual private network, the Internet, an intranet, an extranet, a public switched telephone network, an infrared network, a wireless network, and any suitable combination thereof.

In embodiments utilizing a Web server, the Web server can run any of a variety of server or mid-tier applications, including HTTP servers, FTP servers, CGI servers, data servers, Java servers, and business application servers. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, or TCL, as well as combinations thereof. The server(s) can also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network ("SAN") familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system can also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device.

Embodiments of the present disclosure can be provided as a computer program product including a nontransitory machine-readable storage medium having stored thereon instructions (in compressed or uncompressed form) that can be used to program a computer (or other electronic device) to perform processes or methods described herein. The machine-readable storage medium can include, but is not limited to, hard drives, floppy diskettes, optical disks, CD- ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments can also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software can be via Internet download.

Based on the disclosure and teachings provided herein, it will be understood that other ways and methods of implementing the various embodiments described above are possible. The specification and drawings are illustrative and are not to be construed as limiting the scope of the following claims.

The invention claimed is:

1. A method comprising:
    receiving, at a fluidic temperature control device, a pre-cooked food, wherein the pre-cooked food corresponds to at least one picture from amongst a plurality of pictures of pre-cooked foods, each of which has at least one cook time and at least one cook temperature associated therewith;
    receiving, at a controller of the fluidic temperature control device, a selection of the at least one picture from amongst the plurality of pictures, the at least one picture associated with a cook time and temperature;
    receiving, at the controller of the fluidic temperature control device, a selection of a second picture from amongst a second plurality of pictures, each of which displays one or more food attributes and the second picture having at least one supplemental cook time and at least one supplemental temperature associated therewith;
    identifying, at the controller of the fluidic temperature control device, a specific cook time and a specific temperature based on the cook time and the temperature associated with the at least one picture and the at least one supplemental cook time and the at least one supplemental temperature associated with the second picture; and
    actuating, by the controller, a heating element of the fluidic temperature control device to heat the pre-cooked food according to the specific cook time at the specific temperature in response to receiving the selection of the second picture.

2. The method of claim 1, further comprising:
    receiving, at the controller of the fluidic temperature control device, a selection of a doneness level, wherein the doneness level is indicated from a selection of a picture of the doneness level from a plurality of pictures of doneness levels with a corresponding second supplemental cook time and a second supplemental temperature; and
    modifying, at the controller of the fluidic temperature control device, the specific cook time and the specific temperature with the second supplemental cook time and the second supplemental temperature.

3. The method of claim 2, further comprising:
    actuating, by the controller, the heating element of the fluidic temperature control device to heat the pre-cooked food according to the specific cook time at the specific temperature modified with the second supplemental cook time and the second supplemental temperature.

4. The method of claim 3, further comprising:
    rendering, at a display of the fluidic temperature control device, a notification of an unsafe cook time and an unsafe cook temperature when either or both the specific cook time and the specific temperature are outside a threshold safety value.

5. The method of claim 1, further comprising:
    rendering, at a display of the fluidic temperature control device, a notification of an unsafe cook time and an unsafe cook temperature when either or both the specific cook time and the specific temperature are outside a threshold safety value.

6. The method of claim 1 further comprising:
    receiving, at the controller of the fluidic temperature control device, a manual input of a temperature;
    modifying, by the controller, the specific temperature according to the temperature indicated by the manual input; and
    actuating, by the controller, the heating element of the fluidic temperature control device to heat the pre-cooked food at the specific temperature modified according to the temperature indicated by the manual input.

7. The method of claim 1, further comprising:
    identifying, by the controller, a speed based on the received selection of the second picture; and
    actuating, by the controller, an agitator of the fluidic temperature control device to the speed.

8. The method of claim 7, further comprising:
    updating, by the controller, the speed to an updated speed based on a selection of a doneness level indicated from a selection of a picture of the doneness level; and
    actuating, by the controller, the agitator of the fluidic temperature control device to the updated speed.

9. The method of claim 1, wherein either or both the selection of the at least one picture and the selection of the second picture are received from a remote device communicatively coupled to the fluid temperature control device.

* * * * *